United States Patent
Hirakawa

(10) Patent No.: US 12,290,932 B2
(45) Date of Patent: May 6, 2025

(54) TRAJECTORY GENERATION DEVICE AND AUTOMATIC POSITION CONTROL DEVICE

(71) Applicant: FANUC CORPORATION, Yamanashi (JP)

(72) Inventor: Manabu Hirakawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 234 days.

(21) Appl. No.: 18/004,097

(22) PCT Filed: Jul. 7, 2021

(86) PCT No.: PCT/JP2021/025613
§ 371 (c)(1),
(2) Date: Jan. 3, 2023

(87) PCT Pub. No.: WO2022/009921
PCT Pub. Date: Jan. 13, 2022

(65) Prior Publication Data
US 2023/0256600 A1    Aug. 17, 2023

(30) Foreign Application Priority Data
Jul. 10, 2020    (JP) .................. 2020-119020

(51) Int. Cl.
*B25J 9/16*    (2006.01)
*G05B 19/4103*    (2006.01)

(52) U.S. Cl.
CPC ........ *B25J 9/1664* (2013.01); *G05B 19/4103* (2013.01); *G05B 2219/45104* (2013.01)

(58) Field of Classification Search
CPC ............... B25J 9/1664; G05B 19/4103; G05B 2219/45104; Y02P 90/02
See application file for complete search history.

(56) References Cited

U.S. PATENT DOCUMENTS

| | | | | |
|---|---|---|---|---|
| 1,333,536 A | * | 3/1920 | Brothers | A43D 21/02 |
| | | | | 12/10.2 |
| 4,086,522 A | * | 4/1978 | Engelberger | G05B 19/42 |
| | | | | 29/430 |

(Continued)

FOREIGN PATENT DOCUMENTS

| CN | 108829031 A | 11/2018 |
|---|---|---|
| JP | S62-282304 A | 12/1987 |

(Continued)

OTHER PUBLICATIONS

"An off-line robot motion planning approach for the reduction of the energy consumption;" Fenucci et al., 2016 IEEE 21st International Conference on Emerging Technologies and Factory Automation (ETFA) (2016, pp. 1-8); Sep. 1, 2016. (Year: 2016).*

(Continued)

*Primary Examiner* — Khoi H Tran
*Assistant Examiner* — Jorge O Peche
(74) *Attorney, Agent, or Firm* — Maier & Maier, PLLC

(57) ABSTRACT

A trajectory generation device configured to generate a trajectory along which a control target passes, the device including a storage unit configured to store a plurality of points, and a processor. the processor is configured to perform receiving process of receiving designated path information about a path designated by a user in a partial section between two points in the plurality of points, and trajectory generation process of generating a trajectory in the partial section by using the designated path information, a first path passing through the two points in the plurality of points and at least one anterior passing point through which the control target passes before passing through the two points, and a second path passing through the two points in the plurality of points and at least one posterior passing point (Continued)

through which the control target passes after passing through the two points.

6 Claims, 6 Drawing Sheets

(56) References Cited

U.S. PATENT DOCUMENTS

| | | | | |
|---|---|---|---|---|
| 4,150,328 | A * | 4/1979 | Cannon | G05B 19/4103 708/290 |
| 4,581,698 | A * | 4/1986 | Jaswa | G05B 19/4103 708/290 |
| 4,742,786 | A * | 5/1988 | Hashimoto | D05B 19/08 112/102.5 |
| 4,794,540 | A * | 12/1988 | Gutman | G05B 19/4103 700/262 |
| 4,802,094 | A * | 1/1989 | Nakamura | G05B 19/4183 198/340 |
| 4,835,710 | A * | 5/1989 | Schnelle | G05B 19/41 901/14 |
| 4,835,730 | A * | 5/1989 | Shimano | B25J 9/1661 700/247 |
| 4,851,748 | A * | 7/1989 | Daggett | G05B 19/4141 901/14 |
| 5,046,852 | A * | 9/1991 | Hametner | B21D 5/004 382/152 |
| 5,197,014 | A * | 3/1993 | Seki | G05B 19/4103 700/189 |
| 5,434,489 | A * | 7/1995 | Cheng | G05B 19/4182 318/568.15 |
| 5,768,792 | A * | 6/1998 | Raab | G05B 19/4207 33/529 |
| 5,779,749 | A * | 7/1998 | Nafziger | G05B 19/40937 65/129 |
| 5,963,447 | A * | 10/1999 | Kohn | G05B 19/41865 706/50 |
| 6,216,058 | B1 * | 4/2001 | Hosek | B25J 9/1664 414/217 |
| 6,292,715 | B1 * | 9/2001 | Rongo | B25J 9/1671 700/165 |
| 6,606,528 | B1 * | 8/2003 | Hagmeier | G05B 19/4097 700/98 |
| 6,782,306 | B2 * | 8/2004 | Yutkowitz | G05B 19/4103 700/184 |
| 8,577,499 | B2 * | 11/2013 | Eliasson | B25J 9/1664 700/250 |
| 8,600,554 | B2 * | 12/2013 | Jing | B25J 9/1664 700/263 |
| 10,101,725 | B2 * | 10/2018 | Ghanem | G01B 11/00 |
| 10,534,349 | B2 * | 1/2020 | Kimura | G05B 19/4097 |
| 11,213,945 | B2 * | 1/2022 | Kuwahara | G06F 30/20 |
| 12,109,692 | B2 * | 10/2024 | Beard, III | B25J 11/005 |
| 2003/0033050 | A1 * | 2/2003 | Yutkowitz | G05B 19/4103 700/189 |
| 2004/0133309 | A1 * | 7/2004 | Huttenhofer | G05B 19/4103 700/245 |
| 2004/0158356 | A1 * | 8/2004 | Webb | B25J 9/1623 700/250 |
| 2004/0249509 | A1 * | 12/2004 | Rogers | G05B 19/4103 700/245 |
| 2005/0067995 | A1 * | 3/2005 | Weinhofer | B25J 9/1664 318/574 |
| 2005/0071021 | A1 * | 3/2005 | Weinhofer | B25J 9/1664 700/86 |
| 2005/0107921 | A1 * | 5/2005 | Watanabe | G05B 19/425 700/253 |
| 2005/0251290 | A1 * | 11/2005 | Skourup | G05B 19/42 700/245 |
| 2005/0256611 | A1 * | 11/2005 | Pretlove | B25J 9/1664 700/264 |
| 2007/0030271 | A1 * | 2/2007 | Kamiya | B25J 9/1664 345/442 |
| 2007/0046677 | A1 * | 3/2007 | Hong | G05B 19/41 345/442 |
| 2007/0142967 | A1 * | 6/2007 | Volcic | B25J 9/1674 700/245 |
| 2007/0168060 | A1 * | 7/2007 | Nixon | G06F 9/4488 700/83 |
| 2009/0125146 | A1 * | 5/2009 | Zhang | G05B 19/423 700/253 |
| 2011/0166703 | A1 * | 7/2011 | Byrne | B25J 9/1682 901/50 |
| 2011/0282492 | A1 * | 11/2011 | Krause | B25J 9/1664 901/47 |
| 2012/0255938 | A1 * | 10/2012 | Oe | B23K 26/0884 901/41 |
| 2013/0211578 | A1 * | 8/2013 | Tanuma | G05B 19/4093 700/192 |
| 2014/0249675 | A1 * | 9/2014 | Krishnasamy | H01L 21/67766 700/250 |
| 2014/0371905 | A1 * | 12/2014 | Eberst | G05B 19/4182 700/253 |
| 2015/0073593 | A1 * | 3/2015 | Hamm | B25J 9/1643 700/245 |
| 2015/0273685 | A1 * | 10/2015 | Linnell | B25J 9/1664 901/41 |
| 2016/0031110 | A1 * | 2/2016 | Middleton | B26D 7/01 83/13 |
| 2016/0271796 | A1 * | 9/2016 | Babu | B25J 9/1664 |
| 2017/0008109 | A1 * | 1/2017 | Wuerfel | B23F 23/003 |
| 2017/0095930 | A1 * | 4/2017 | Warashina | B25J 9/1697 |
| 2017/0102694 | A1 * | 4/2017 | Enver | G05B 19/4184 |
| 2017/0103103 | A1 * | 4/2017 | Nixon | G06F 16/2452 |
| 2017/0166399 | A1 * | 6/2017 | Stubbs | G06Q 10/087 |
| 2017/0343982 | A1 * | 11/2017 | Roders | G05B 19/4097 |
| 2017/0364076 | A1 * | 12/2017 | Keshmiri | G05B 19/41 |
| 2018/0079077 | A1 * | 3/2018 | Yoon | B25J 13/087 |
| 2018/0101166 | A1 * | 4/2018 | Aldridge | B25J 9/1671 |
| 2018/0345494 | A1 * | 12/2018 | Hedlund | G05B 19/42 |
| 2018/0354130 | A1 * | 12/2018 | Preisinger | G05B 19/423 |
| 2019/0143523 | A1 * | 5/2019 | Harel | G06F 18/23 700/259 |
| 2019/0192234 | A1 * | 6/2019 | Gadda | A61B 34/37 |
| 2019/0196453 | A1 * | 6/2019 | Xiong | G05B 19/4163 |
| 2020/0338730 | A1 * | 10/2020 | Yamauchi | B25J 9/1671 |
| 2021/0042665 | A1 * | 2/2021 | Ghanem | B25J 9/0084 |
| 2022/0001532 | A1 * | 1/2022 | Ghanem | B25J 9/1687 |
| 2022/0075353 | A1 * | 3/2022 | Derecichei | G05B 19/41885 |
| 2022/0395978 | A1 * | 12/2022 | Sherrod | B25J 9/1653 |
| 2023/0129346 | A1 * | 4/2023 | Haus | G05D 1/0212 700/255 |
| 2023/0256600 | A1 * | 8/2023 | Hirakawa | G05B 19/4103 700/245 |
| 2024/0181630 | A1 * | 6/2024 | Takagi | B25J 9/1664 |

FOREIGN PATENT DOCUMENTS

| | | |
|---|---|---|
| JP | H06-058603 B2 | 8/1994 |
| JP | H09-035054 A | 2/1997 |
| JP | H11249723 A | 9/1999 |
| JP | 3396342 B | 4/2003 |
| JP | 2019135076 A | 8/2019 |
| JP | 2020049554 A | 4/2020 |
| JP | 2021-086181 A | 6/2021 |
| KR | 20240064386 A * | 5/2024 |
| WO | 2018126354 A1 | 7/2018 |
| WO | WO-2019064919 A1 * | 4/2019 ............ G05B 19/42 |

OTHER PUBLICATIONS

"Selection of Near-Minimum Time Geometric Paths for Robotic Manipulators;" Shin et al., 1985 American Control Conference (1985, pp. 346-355); Jun. 1, 1985. (Year: 1985).*

"Automatic generation of trajectory planners for industrial robots;" Shin et al., 1986 IEEE International Conference on Robotics and Automation (vol. 3, 1986, pp. 260-266); Jan. 1, 1986. (Year: 1986).*

(56) References Cited

OTHER PUBLICATIONS

International Search Report issued on Sep. 21, 2021, in corresponding International Application No. PCT/JP2021/025613, 9 pages.

\* cited by examiner

TRAJECTORY GENERATION DEVICE AND AUTOMATIC POSITION CONTROL DEVICE

TECHNICAL FIELD

The present disclosure relates to a trajectory generation device and an automatic position control device.

BACKGROUND

In the fields of numerical control (NC) machine tools and industrial robots, a method for generating a trajectory of a tool by interpolating discrete points given as passing points of the tool has been known (for example, see Japanese Examined Patent Application, Publication No. H06-058603).

Typically, a trajectory is generated by calculating interpolating curves connecting multiple adjoining points, and connecting the interpolating curves to each other. In order for a tool to pass through a passing point without slowing down, the interpolating curves need to be smoothly connected to each other at the passing point.

In Japanese Examined Patent Application, Publication No. H06-058603, in the calculation of an interpolating curve $S_m(t)$ of a section between points $P_m$ and $P_{m+1}$, points $P_{m-1}$ and $P_{m+2}$ in the adjoining sections are also used for the connection between the interpolating curves of the adjoining sections.

More specifically, in Japanese Examined Patent Application, Publication No. H06-058603, a quadratic curve $S_m(t)$ passing through three points $P_{m-1}$, $P_m$, and $P_{m+1}$ and a quadratic curve $S_{m+1}(t)$ passing through three points $P_m$, $P_{m+1}$, and $P_{m+2}$ are derived, and the interpolating curve $S_m(t)$ is calculated on the basis of the primary differential coefficient and the secondary differential coefficient of the quadratic curves at the points $P_m$ and $P_{m+1}$.

DESCRIPTION OF EMBODIMENTS

In a partial section between points $P_m$ and $P_{m+1}$, in order to connect $S_m(t)$ and $S_{m+1}(t)$ as smoothly as possible, control of a control target in this section is gradually changed from $S_m(t)$ to $S_{m+1}(t)$ in accordance with the progress of t. The trajectory at this time depends on $S_m(t)$ and $S_{m+1}(t)$, and, when, for example, they are different types of functions, it is difficult for a user to estimate the trajectory in this partial section. Therefore, it is desirable to make it easy for a user to estimate the trajectory in this section while smoothly connecting $S_m(t)$ and $S_{m+1}(t)$.

An aspect of the present disclosure is a trajectory generation device configured to generate a trajectory along which a control target passes, the trajectory generation device including: a storage unit configured to store a plurality of points through which the control target passes; and a processor, the processor is configured to perform: receiving process of receiving designated path information about a path designated by a user in a partial section between two points in the plurality of points, and trajectory generation process of generating, upon reception of the designated path information, a trajectory in the partial section by using the designated path information, a first path passing through the two points in the plurality of points and at least one anterior passing point through which the control target passes before passing through the two points, and a second path passing through the two points in the plurality of points and at least one posterior passing point through which the control target passes after passing through the two points.

A trajectory generation device, an automatic position control device, and a trajectory generation method according to an embodiment will be described below with reference to the drawings.

Figure 2:
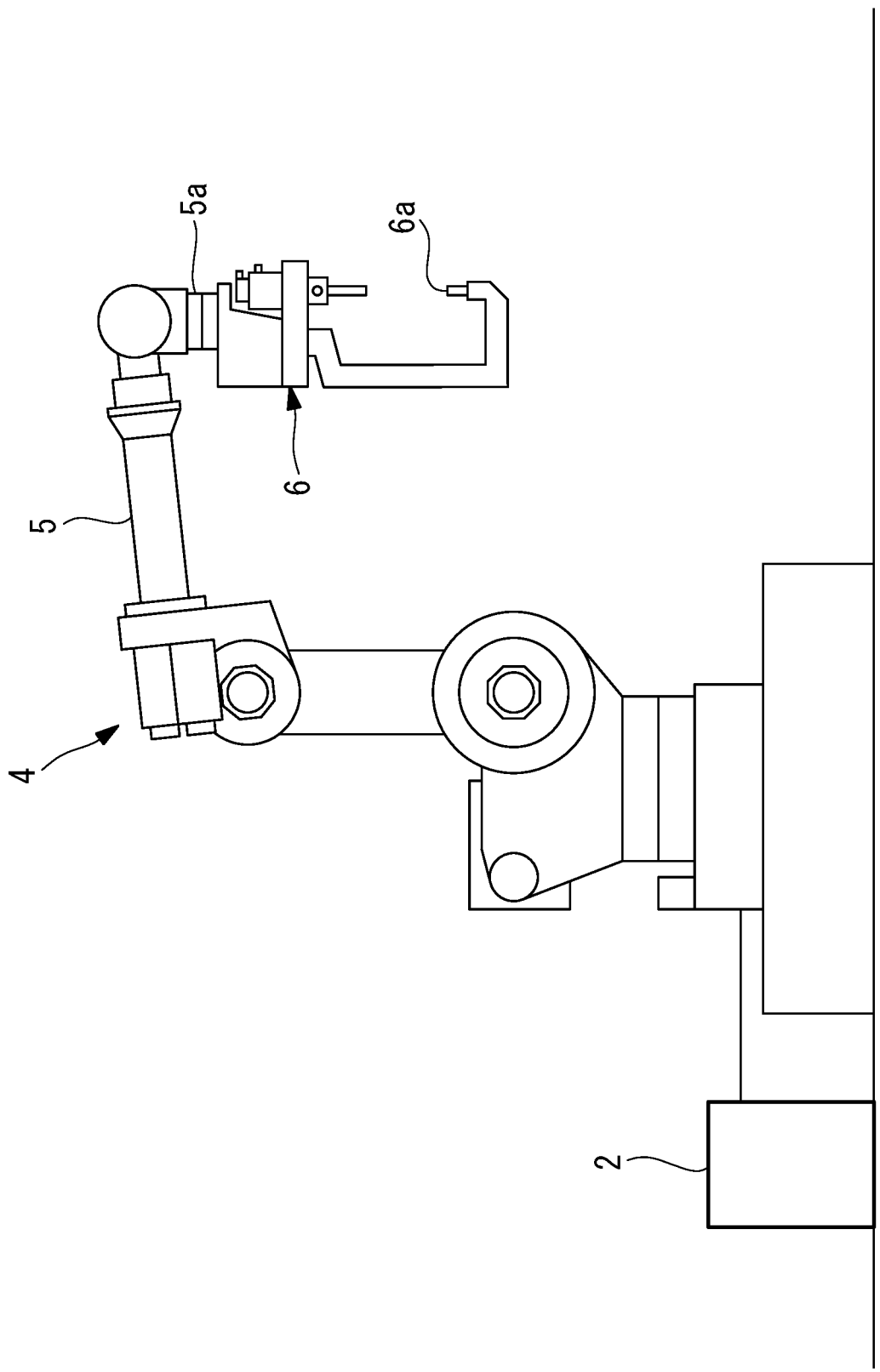
FIG. 2 is a schematic diagram of a control target to be controlled in this embodiment.

An automatic position control device 2 controls the position of a control target. As shown in FIG. 2, examples of a control target 4a includes the position of a distal end 5a of an articulated robot arm 5 of a robot 4 for industrial use or the like, and a predetermined position 6a of an end effector 6, such as a hand or a tool, attached to the distal end 5a of the robot arm 5. Another example of the control target 4a is a tool of a numerical control (NC) machine tool. Accordingly, the automatic position control device 2 can be a robot control device for controlling a robot or a numerical control device for controlling an NC machine tool.

Figure 1:
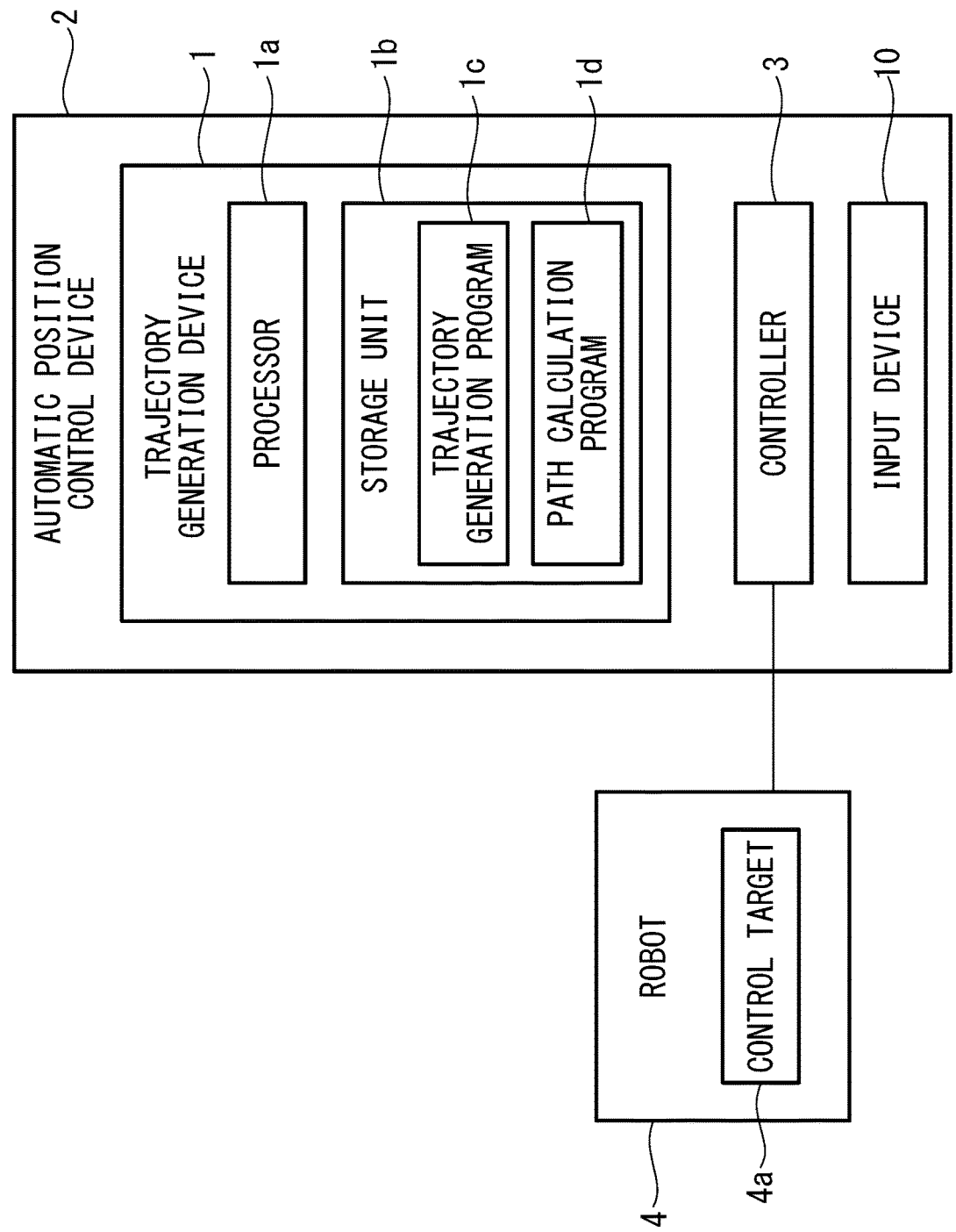
FIG. 1 is a block diagram of an automatic position control device and a trajectory generation device according to an embodiment.

As shown in FIG. 1, the automatic position control device 2 includes: a trajectory generation device 1 that generates a trajectory passing through n discrete points $P_1, P_2, \ldots, P_{i-1}, P_i, P_{i+1}, P_{i+2}, \ldots$ that are given as a sequence of points; a controller 3 that moves the control target 4a along the trajectory generated by the trajectory generation device 1; and an input device 10. Examples of the input device 10 include a keyboard, a mouse, a display device with a touchscreen function, and a portable input device for setting an motion program. When the control target 4a is the distal end 5a of the robot arm 5 or the predetermined position 6a of the end effector 6, the controller 3 is a robot controller that controls the motion of the robot arm 5, and the automatic position control device 2 is the robot control device. In this case, the controller 3 includes a processor, a storage device storing an motion program, and the like. Note that the automatic position control device 2 may be a computer that generates an motion program for the robot off-line.

The trajectory generation device 1 includes a processor 1a, such as a central processing unit, and a storage unit 1b including a RAM, a ROM, a non-volatile storage, a hard disk, or the like. The above-described discrete n points are input by using the input device 10 or are received by the trajectory generation device 1 from another computer, and are stored in the storage unit 1b.

The point $P_i$ is a teaching point set by, for example, an operator. In the case where the control target 4a moves in a two-dimensional plane, the position of the point $P_i$ is represented by two-dimensional coordinates $(x_i, y_i)$, whereas, in the case where the control target 4a moves in a three-dimensional space, the position of the point $P_i$ is represented by three-dimensional coordinates $(x_i, y_i, z_i)$.

Furthermore, the storage unit 1b stores a trajectory generation program 1c and a path calculation program 1d. The calculation by the trajectory generation device 1, which will be described below, is achieved by the processor 1a executing processing in accordance with the trajectory generation program 1c.

Next, an example of a basic trajectory generation method performed by the trajectory generation device 1 will be described.

Figure 3:
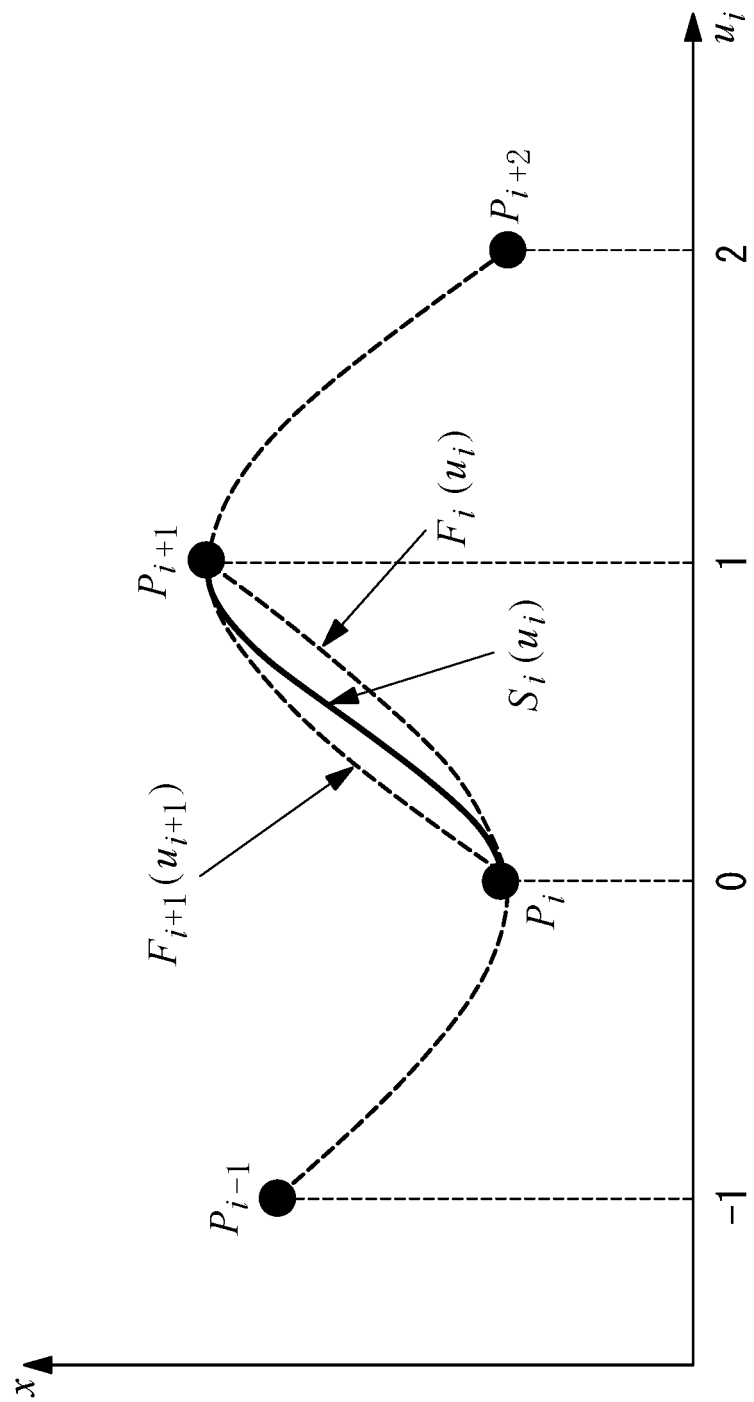
FIG. 3 is a diagram showing a trajectory generation method according to this embodiment.

As shown in FIG. 3, the trajectory generation device 1 calculates a curve $S_i$ passing through two adjoining points $P_i$ and $P_{i+1}$ in the sequence of points and interpolating between the two points $P_i$ and $P_{i+1}$, and calculates a partial trajectory between the two points $P_i$ and $P_{i+1}$ represented by the curve $S_i$. The point $P_i$ is the i-th point in the sequence of points. By calculating the curve $S_i$ on the basis of four points $P_{i-1}$, $P_i$, $P_{i+1}$, and $P_{i+2}$, which are the (i−1)-th to the (i+2)-th points, the trajectory generation device 1 calculates a partial trajectory between the points $P_i$ and $P_{i+1}$ defined by the four points $P_{i-1}$, $P_i$, $P_{i+1}$, and $P_{i+2}$ or multiple points including them. The trajectory generation device 1 obtains n−1 partial trajectories by calculating a partial trajectory for each section between adjoining two points $P_i$ and $P_{i+1}$.

Next, the trajectory generation device 1 connects the n−1 partial trajectories to one another to generate a trajectory passing through all n points $P_1$, $P_2$, ..., $P_n$.

Here, the trajectory generation device 1 calculates a curve $S_i$ (where 1≤i≤n−2) that satisfies the two conditions below, which are: at the point $P_{i+1}$, the first-order derivative values of the partial trajectory (the first curve) $S_i(u_i)$ and the partial trajectory (the second curve) $S_{i+1}(u_{i+i})$ are equal to each other; and at the point $P_{i+1}$, the second-order derivative values of the partial trajectory $S_i(u_i)$ and the partial trajectory $S_{i+1}(u_{i+1})$ are equal to each other.

The first-order and second-order derivative values of the partial trajectory $S_i(u_i)$ respectively represent the speed and acceleration of the control target 4a moving along the partial trajectory $S_i(u_i)$. Accordingly, the position, speed, and acceleration of the control target 4a moving along the trajectory generated by the trajectory generation device 1 are continuous at all the points $P_2$, $P_3$, ..., $P_{n-1}$, which are connection points of the partial trajectories.

Next, a method for calculating the partial trajectory $S_i(u_i)$ will be described below.

As shown in FIG. 3, a function $F_i(u_i)$ of a curve passing through three continuous points $P_{i-1}$, $P_i$, and $P_{+1}$ is calculated for i=2, 3, ..., and n−1, and, for example, a function $F_i(u_i)$ passing through two points $P_1$ and $P_2$ is calculated for i=1. At this time, $u_i$ is a variable representing the progress of interpolation between the point $P_i$ and the point $P_{i+1}$ with a value from 0 to 1. Note that $u_{i+1}=u_{i-1}$, $u_{i+2}=u_{i-2}$, and the same applies to the rest. Specifically, in FIG. 3, $u_i=0$ at the point $P_i$, $u_i=-1$ at the point $P_{i-1}$, $u_i=1$ at the point $P_{i+1}$, and the variable $u_{i+1}$ of the expression $F_{i+1}(u_{i+1})$ at the point $P_{i+1}$ is 0. The function $F_i(u_i)$ passes through the point $P_{i-1}$ at $u_i=-1$, passes through the point $P_i$ at $u_i=0$, and passes through the point $P_{i+1}$ at $u_i=1$. Similarly, the function $F_{i+1}(u_{i+1})$ passes through the point $P_i$ at $u_i=0$, passes through the point $P_{i+1}$ at $u_i=1$, and passes through the point $P_{i+2}$ at $u_i=2$.

FIG. 3 shows an example of the control of the control target 4a in the X-axis direction. FIG. 3 shows a sequence of points $P_{i-1}$, $P_i$, $P_{i+1}$, $P_{i+2}$, ... on a u-x plane expressed by using a u axis representing the variable $u_i$ and an x axis representing $x_i$. In this plane, the function $F_i(u_i)$ is, for example, a function for a quadratic curve, such as an arc, an elliptic arc, or a parabola. The function $F_i(u_i)$ may be a function for another quadratic curve, a primary linear function, or a function for a cubic or higher-order curve.

As in this case, when the sequence of points $P_1$, $P_2$, ..., and $P_n$ is considered by decomposing the points into the x dimension, the y dimension, and the z dimension, similarly to the sequence of points $P_1$, $P_2$, ..., and $P_n$ on the u-x plane, the function $F_i(u_i)$ is calculated for the sequence of points $P_1$, $P_2$, ..., and $P_n$ on the u-y plane, and the function $F_i(u_i)$ is calculated for the sequence of points $P_1$, $P_2$, ..., and $P_n$ on the u-z plane.

Next, for the four points $P_{i-1}$, $P_i$, $P_{i+1}$, and $P_{i+2}$ arbitrarily set in the sequence of points $P_1$, $P_2$, ..., and $P_n$, the partial trajectory $S_i(u_i)$ in the partial section is calculated from Expression (1) below. Note that, in this embodiment, the four points are four continuous points.

Calculation of the partial trajectory $S_i(u_i)$ in the next or previous partial section is performed by using the point $P_{i-1}$, $P_i$, $P_{+1}$, and $P_{i+2}$ corresponding thereto.

$$S_i(u_i) = (1-K(u_i)) \times F_i(u_i) + K(u_i) \times F_{i+1}(u_{i+1}) \tag{1}$$

where $K(u_i)$ is a function satisfying Condition 1 below. (Condition 1) when $u_i$ changes from 0 to 1, the value of $K(u_i)$ monotonically increases from 0 to 1.

Note that $K(u_i)$ may be any function whose value monotonically increases from 0 to 1 when $u_i$ changes from 0 to 1, and, in an example, $K(u_i)$ is a function defined by Expression (2) below. In this case, the values of the partial trajectories $S_i(u_i)$ and $S_i-1(u_i-1)$ at the point $P_i$ are equal, and the primary derivative values, the secondary derivative values, and the tertiary derivative values thereof are equal to each other.

$$K(u_i) = u^3(10-15u+6u^2) \tag{2}$$

Next, using FIGS. 4 and 5, an example trajectory generation method of the present disclosure will be described.

Figure 4:
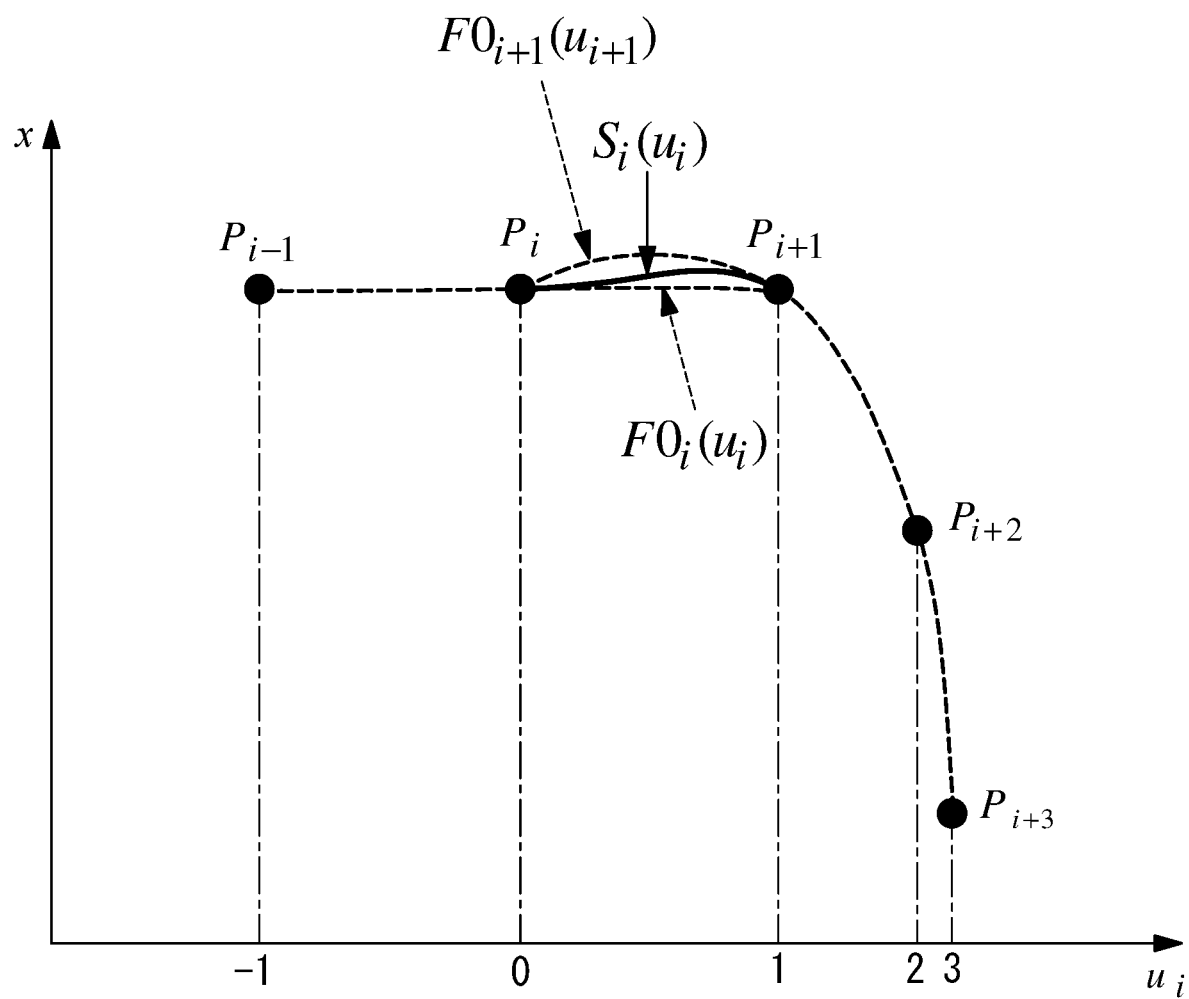
FIG. 4 is a diagram showing the trajectory generation method according to this embodiment.

FIG. 4 shows another example of control of the control target 4a in the axial direction. In FIG. 4, the function (the first path) $F0_i(u_i)$ defining the path in the section from the point $P_{i-1}$ to the point $P_{i+1}$ is a primary function that draws a straight line, the function (the second path) $F0_{i+1}(u_{i+1})$ defining the path in the section from the point $P_i$ to the point $P_{i+2}$ is a function that draws a quadratic curve, such as an arc, an elliptic arc, or a parabola, or as a cubic curve or the like. Note that the function $F_i(u_i)$ may be a quadratic function or a cubic function that draws a substantially straight line. In one example, the processor 1a automatically calculates the first path and the second path passing through their corresponding target point groups on the basis of a known program.

By using Expression (1) in the case of FIG. 4, the connection of the paths at the point $P_{i+1}$ becomes smooth. However, as in the partial trajectory $S_i(u_i)$ shown in FIG. 4, the trajectory between the point $P_i$ and the point $P_{i+1}$ is non-linear. This situation may be unwanted by a user, and, for example, a user may want a linear trajectory between the point $P_i$ and the point $P_{i+1}$.

Figure 5:
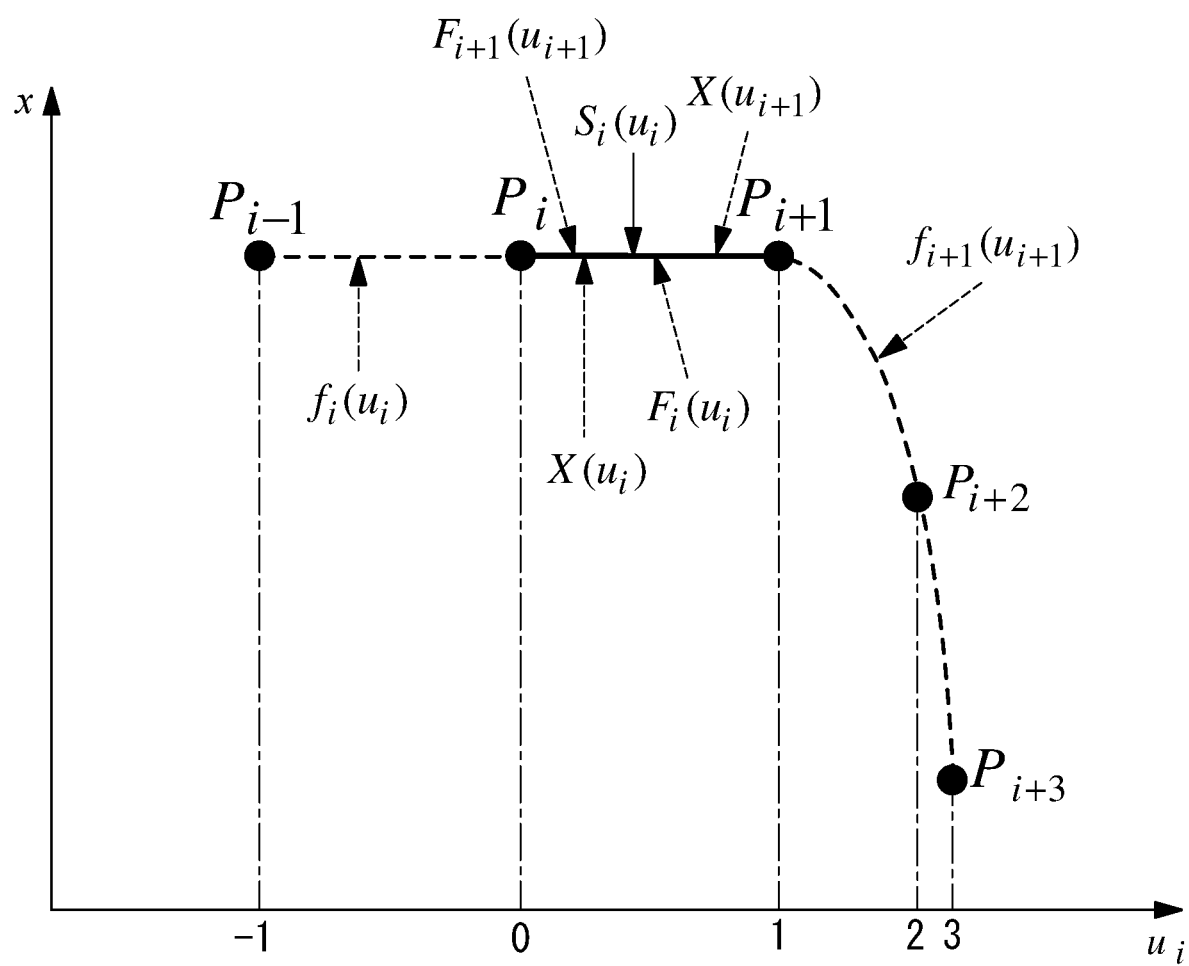
FIG. 5 is a diagram showing the trajectory generation method according to this embodiment.

In this embodiment, as shown in FIG. 5, the processor 1a derives a first section path $F_i(u_i)$ as Expression (3) below and a second section path $F_{i+1}(u_{i+1})$ as Expression (4) below on the basis of the path calculation program 1d.

{Formula 1}

$$F_i(u_i) = \begin{cases} f_i(u_i) u_i < 0 \\ X(u_i) u_i \geq 0 \end{cases} \tag{3}$$

{Formula 2}

$$F_{i+1}(u_{i+1}) = \begin{cases} X(u_{i+1}) u_{i+1} < 0 \\ f_{i+1}(u_{i+1}) u_{i+1} \geq 0 \end{cases} \tag{4}$$

$X(u_i)$ in Expression (3) and $X(u_{i+1})$ in Expression (4) are functions that are equal to each other in the section between the point $P_i$ and the point $P_{i+1}$, and, in the case of FIG. 5, are functions that draw straight lines. The partial trajectory $S_i(u_i)$ generated by applying the first section path $F_i(u_i)$ derived by Expression (3) and the second section path $F_{i+1}(u_{i+})$ derived by Expression (4) to Expression (1) above is a linear trajectory extending along $X(u_i)$.

Because $X(u_i)$ and $X(u_{i+1})$ are equal in the section between the point $P_i$ and the point $P_{i+1}$, it is possible to connect the first section path $F_i(u_i)$ and the second section path $F_{i+1}(u_{i+1})$ by using an expression other than Expression (1).

Here, $f_i(u_i)$ in Expression (3) is a function smoothly connected to $X(u_i)$ at the point $P_i$, or when $u_i=0$. This function $f_i(u_i)$ is derived by the processor $1a$ by using, for example, the first path $F0_i(u_i)$ and $X(u_i)$ on the basis of the path calculation program $1d$. For example, in the section where $u_i$ is from $-1$ to $0$, $f_i(u_i)$ is calculated from Expression (5) below. Note that $u_{i-1}=u_i+1$, and $u_i-2=u_i+2$, and the same applies to the rest. Also in the section where $u_i$ is from 1 to 2, similarly to the above, a function $f_{i+1}(u_{i+1})$ that is smoothly connected to $X(u_{i+1})$ is calculated.

$$f_i(u_i)=(1-K(u_{i-1}))\times F0_i(u_i)+K(u_{i-1})\times X(u_i) \quad (5)$$

$X(u_i)$ and $X(u_{i+1})$ are set on the basis of the input by a user to the input device 10 of the automatic position control device 2. For example, the user inputs designated path information by using the input device 10. The designated path information includes at least a section in which the trajectory is to be designated, and the type of the path in that section. Examples of the type of the path include a linear path, an arc path, and an elliptic arc path. The type of the path may also be a spiral curved path, a quadratic-function curved path, a cubic-function curved path, or the like. In the case of FIG. 5, a point group shown in FIG. 5 is displayed on a screen of the input device 10, and, when a user instructs the point $P_{i+1}$, the section between the point $P_i$ and the point $P_{i+1}$, or the like in the point group with the input device 10, section designated information designating the section between the point $P_i$ and the point $P_{i+1}$ is input.

Furthermore, multiple types of the path, such as a linear path, an arc path, and an elliptic arc path, are displayed on the screen, and, when a user selects one of them with the input device 10, the information about the type of the path is input. Note that a user may input, to the input device 10, that the first path or the second path is selected as the trajectory between the point $P_i$ and the point $P_{i+1}$. Also when the first path is selected, $X(u_i)$ and $X(u_{i+1})$ are linear.

Note that $X(u_i)$ and $X(u_{i+1})$ do not need to be functions that are completely equal to each other in the section between the point $P_i$ and the point $P_{i+1}$. Also in that case, $X(u_{i+1})$ is a function different from $f_{i+1}(u_{i+1})$. Preferably, $X(u_{i+1})$ is a function that draws the same type of path as that of $X(u_i)$, and, when $X(u_i)$ is a function that draws a straight line, $X(u_{i+1})$ is also a function that draws a straight line, and, when $X(u_i)$ is a function that draws an arc, $X(u_{i+1})$ is also a function that draws an arc.

When $X(u_i)$ and $X(u_{i+1})$ are not the functions that are completely equal to each other in the section between the point $P_i$ and the point $P_{i+1}$, it is possible to smoothly connect $X(u_i)$ of $F_i(u_i)$ and $X(u_{i+1})$ of $F_{i+1}(u_{i+1})$ in the partial section by using Expression (1). Also when $X(u_i)$ and $X(u_{i+1})$ are completely equal to each other in the section between the point $P_i$ and the point $P_{i+1}$, it is possible to connect $F_i(u_i)$ and $F_{i+1}(u_{i+1})$ in the partial section by using Expression (1).

Figure 6:
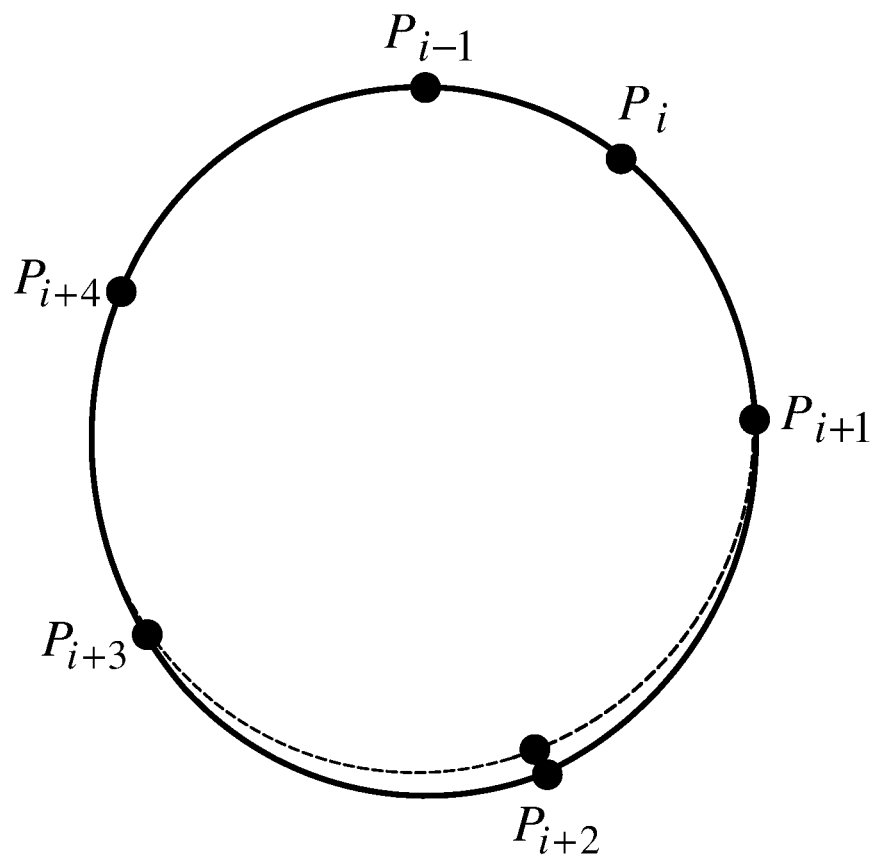
FIG. 6 is a diagram showing the trajectory generation method according to this embodiment.

Furthermore, as shown in FIG. 6, the function $F0_i(u_i)$ defining the first path and the function $F0_{i+1}(u_{i+1})$ defining the second path may both be functions that draw an arc. In this case, by instructing the section in which the trajectory is to be designated and selecting, for example, the first path as the trajectory in that section with the input device 10, the designated path information is also input to the trajectory generation device 1. Note that, instead of selecting the first path as the trajectory between the point $P_i$ and the point $P_{i+1}$, it is also possible to input, with the input device 10, that the path is an arc path, and the radius, the center, and the like of the arc.

In the above-described embodiment, although the partial trajectory $S_i(u_i)$ is calculated by using four continuous points, the calculation may be performed by using four non-continuous points. For example, in FIG. 5, $f_{i+1}(u_{i+1})$ of the second section path may be set as a function representing the path between the point $P_{i+1}$ and the point $P_{i+3}$. In this case, for example, $X(u_i)$ of the first section path and $X(u_{i+1})$ of the second section path are set as functions representing the path between the point $P_i$ and the point $P_{i+1}$. Furthermore, $f_i(u_i)$ of the first section path is set as a function representing the path between the point $P_{i-1}$ and the point $P_i$. Furthermore, the function $F0_{i+1}(u_{i+1})$ defining the second path corresponds to the section from the point $P_{i+1}$ to the point $P_{i+3}$. Also in this case, the same advantageous effect as above is obtained.

Furthermore, in the above-described embodiment, the section between the point $P_i$ and the point $P_{i+1}$ in FIG. 5 is instructed by the input device 10. Instead, it is possible to instruct, for example, the section between the point $P_{i+1}$ and the point $P_{i+3}$ in FIG. 5 as a trajectory designating section. In that case, the point $P_{i+4}$ beyond the point $P_{i+3}$ is needed.

In the above-described embodiment, for example, in FIG. 5, a trajectory in the partial section between the point $P_i$ and the point $P_{i+1}$ is formed by using the first path $F0_i(u_i)$ passing through two points $P_i$ and $P_{i+1}$ and an anterior passing point $P_{i-1}$ through which the control target $4a$ passes before passing through the two points $P_i$ and $P_{i+1}$, a second path $F0_{i+1}(u_{i+1})$ passing through the two points $P_i$ and $P_{i+1}$ and a posterior passing point $P_{i+2}$ through which the control target $4a$ passes after passing through the two points $P_i$ and $P_{i+1}$, and designated path information input to the input device 10 by a user.

For example, in FIG. 5, when the partial section between the point $P_i$ and the point $P_{i+1}$ is generated without designated path information, the trajectory in the partial section deviates from a linear trajectory, as shown in FIG. 4, which is not intended by a user. When the control target $4a$ is a tool like a welding tool, it is essential to make the machining trajectory thereof accord with that intended by the user, in order to ensure the strength, durability, and the like of products.

In robots, the positions of passing points (teaching points) of the control target $4a$ are set depending on the shape of objects to be worked, and sometimes the passing points are arranged substantially linearly or substantially in an arc. In such a case, the trajectory generation device 1 generates a quadratic curve, cubic curve, or similar trajectory that is not linear or arc-shaped such that the trajectory mathematically passes through all the points. This often results in deviation of the trajectory between the passing points from that assumed by the user. In contrast, in the above-described embodiment, it is possible to input, to the input device 10, the type of the path in the partial section as the designated path information. For example, as in the examples shown in FIGS. 5 and 6, the type of the path, such as a linear path or an arc path, is input. This configuration realizes generation of a trajectory for the control target 4a intended by a user while reliably passing through the points $P_i$ and $P_{i+1}$.

Note that the present invention is not limited to the configuration in which a user inputs, to the input device 10, designated path information for all partial sections. In one example, a user inputs designated path information for an important partial section, and the processor 1a generates partial trajectories for the other partial sections by applying the first path $F0_i(u_i)$ and the second path $F0_{i+1}(u_{i+1})$ to, for example, Expression (1).

Note that the trajectory generation device 1 does not necessarily have to generate a trajectory passing through all n points $P_1, P_2, \ldots,$ and $P_n$ preliminarily stored in the storage unit 1b, but may create a new point $P_j'$ near a stored point $P_j$ as necessary and generate a trajectory passing through the point $P_j'$ instead of the point $P_j$.

For example, when n points $P_1, P_2, \ldots,$ and $P_n$ are teaching points, sometimes the control target 4a does not need to exactly pass through some of the teaching points. In such a case, for example, in order to generate an optimum trajectory for moving the control target 4a smoothly, the teaching point $P_j$ may be changed to a nearby point $P_j'$, and the point $P_j'$ may be stored in the storage unit 1b as a changed teaching point.

The invention claimed is:

1. A trajectory generation device configured to generate a trajectory along which a control target passes, the trajectory generation device comprising:
   a storage unit configured to store a plurality of points through which the control target passes; and
   a processor configured to perform:
      a receiving process of receiving designated path information about a path designated by a user in a partial section between two points in the plurality of points, and
      a trajectory generation process of generating, by using the designated path information, a first path passing through the two points in the plurality of points and at least one anterior passing point through which the control target passes before passing through the two points, and a second path passing through the two points in the plurality of points and at least one posterior passing point through which the control target passes after passing through the two points, a first expression of the trajectory in the partial section and a second expression of the trajectory in a following partial section between the partial section and the at least one posterior passing point,
   the processor is configured to make the trajectory in the partial section to be one corresponding to a pass type indicated in the designated path information, and conduct the trajectory generation process so as to make first-order derivative values of the first expression and the second expression become equal at a point between the partial section and the following partial section, and
   wherein the processor is configured to control the position of the control target to move the control target along the generated trajectory.

2. The trajectory generation device according to claim 1, wherein the designated path information indicates that the pass type in the partial section is any one of a linear path, an arc path, an elliptic arc path, a spiral curved path, a quadratic-function curved path, and a cubic-function curved path.

3. The trajectory generation device according to claim 1, wherein the anterior passing point, the two points, and the posterior passing point are four continuous points through which the control target passes in this order.

4. The trajectory generation device according to claim 1, wherein the processor is configured to perform calculation process of calculating a first section path passing through the anterior passing point and the two points by using the first path and the designated path information, and a second section path passing through the two points and the posterior passing point by using the second path and the designated path information.

5. An automatic position control device configured to control a position of a control target, the automatic position control device comprising:
   a trajectory generation device configured to generate a trajectory along which a control target passes; and
   a controller configured to move the control target along the trajectory generated by the trajectory generation device,
   wherein the trajectory generation device comprises:
   a storage unit configured to store a plurality of points through which the control target passes; and
   a processor configured to perform:
      a receiving process of receiving designated path information about a path designated by a user in a partial section between two points in the plurality of points, and
      a trajectory generation process of generating, by using the designated path information, a first path passing through the two points in the plurality of points and at least one anterior passing point through which the control target passes before passing through the two points, and a second path passing through the two points in the plurality of points and at least one posterior passing point through which the control target passes after passing through the two points, a first expression of the trajectory in the partial section and a second expression of the trajectory in a following partial section between the partial section and the at least one posterior passing point,
   wherein the processor is configured to make the trajectory in the partial section to be one corresponding to a pass type indicated in the designated path information, and conduct the trajectory generation process so as to make first-order derivative values of the first expression and the second expression become equal at a point between the partial section and the following partial section.

6. The automatic position control device according to claim 5, wherein
   the controller configured to control motion of a robot arm, and
   the control target is a distal end of the robot arm or an end effector that is attached to the distal end of the robot arm.

* * * * *